Jan. 6, 1970   E. A. VON SEGGERN ET AL   3,487,817
TWO CYCLE ENGINE
Filed Feb. 13, 1968
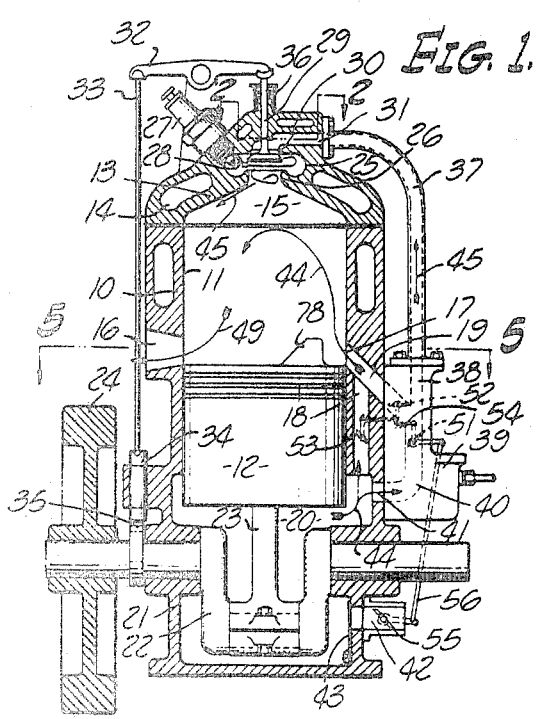
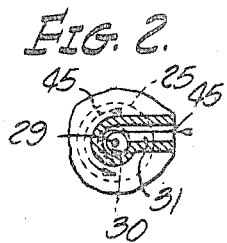
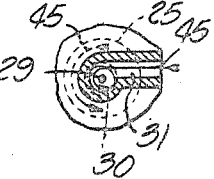
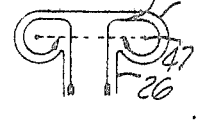
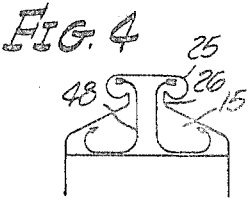
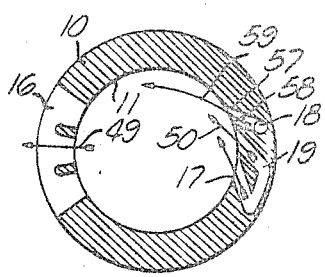
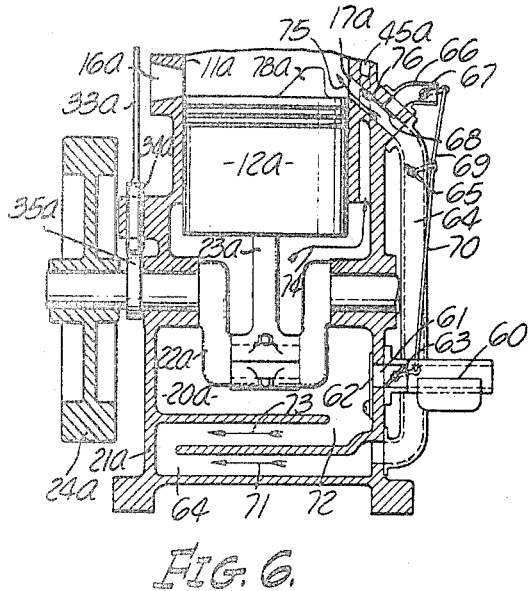
INVENTORS
ERNEST A. VON SEGGERN
HENRY E. VON SEGGERN
BY Forrest J. Lilly
ATTORNEY

United States Patent Office 3,487,817
Patented Jan. 6, 1970

3,487,817
TWO CYCLE ENGINE
Ernest A. von Seggern, 1051 E. Angeleno, Burbank, Calif. 90201, and Henry E. von Seggern, Rte. 2, Box 1910, Escondido, Calif. 92025
Filed Feb. 13, 1968, Ser. No. 705,180
Int. Cl. F02b *19/12, 25/16*
U.S. Cl. 123—65   6 Claims

ABSTRACT OF THE DISCLOSURE

A two cycle engine of the type having an ignition chamber is described. The engine is designed to operate with excess air in stratified relationship with the normal fuel-air mixture in the combustion process. Means are shown whereby the fuel-air mixture and the air may be introduced into the cylinder separately, either simultaneously through separate passages, or in sequence through a single passage. In the sequential method, air and a separate fuel-air mixture are introduced into tubular conduit means of relatively small cross-section, one behind the other, and both are subsequently displaced into the cylinder without mixing in the conduit. Separation is maintained in the cylinder by means of organized circulation therein. Displacement of the air and fuel mixture may be by conventional closed crankcase compression means, and control valves are shown for regulating the quantity of fuel mixture and air supplied at varying engine loads.

FIELD OF THE INVENTION

This invention relates to an internal combustion engine of the two cycle type which utilizes a heterogeneous working fluid in combination with a separate homogeneous ignition charge. More specifically, it relates to an engine of this class in which the working fluid is composed of variable proportions of fuel, air in excess of stoichiometric requirements, and recycled exhaust gas, and the ignition charge is composed of a substantially stoichiometric fuel-air mixture. It also relates to an engine of this class in which the components of the heterogeneous working fluid may be principally mixed together prior to combustion, or may be substantially stratified, and the localized ignition charge is ignited by electric spark or other conventional means.

BACKGROUND OF THE INVENTION

Two cycle engines are full pressure cycle engines, even though the power control may be achieved by means of throttling the fuel mixture admitted to the engine crankcase or other mixture introduction means. There is accordingly a preponderance of exhaust gas in the cylinder at light load and idle operation, and combustion is normally poor and uncertain.

It is accordingly a general object of the invention to provide a two cycle engine which will fire evenly from idle to full load, and which will operate more efficiently and with a cleaner and more odorless exhaust than has heretofore been possible. Further objects of the invention are to provide means for localizing the ignition portion of the fuel charge by utilizing a toroidal circulation, and to add excess air to the fuel charge which is separate from the ignition charge either by pre-mixing to form a controlled and variable fuel-air ratio or by stratification to hold the normal fuel charge and the excess air separate in the engine cylinder until after combustion is initiated.

SUMMARY OF THE INVENTION

By localizing a small, substantially stoichiometric fuel-air charge in a chamber separate from, but in open communication with, the engine cylinder, good combustion is attained. It is necessary, however, to provide a chamber which will maintain the fuel charge in a localized condition during the compression cycle while exhaust gases are compressed into the chamber, and for this a toroidally shaped cavity is provided. Gases from the cylinder are compressed into the chamber along a central axis normal to the plane of the toroidal cavity which induces a toroidal flow (smoke ring) in the chamber and this acts to concentrate the fuel mixture along the axis of spin therein. A spark plug then ignites this mixture at a point on the axis of spin. The process is further enhanced by introducing a spin about the central axis normal to the plane of said toroidal cavity, both in said cavity and in the cylinder, prior to compression.

Combustion is also greatly improved if the exhaust gas in the cylinder is at least partially replaced by air. This is true not only at idle operation but at all loads, and accordingly means are provided for introducing this air in combination with the fuel mixture which is admitted to the cylinder, as distinct from that which is provided for the toroidal chamber, or ignition chamber as it is defined. In some designs the excess air is mixed with the fuel-air mixture, making the mixture "lean." In other designs, the air is introduced separately to provide stratification. In a stratified mixture, the excess air does not enter into the combustion until a substantial portion of the normal stoichiometric fuel-air mixture has been burned, and this provides a very fast and clean reaction. In addition, when the stratified excess air is introduced so as to place it between the fuel-air mixture and the exhaust port, the loss of fuel through the exhaust port during scavenging of the cylinder is also minimized.

The engine described herein is shown in one embodiment in which air only is compressed in the crankcase, and the fuel-air mixture is supplied by a pressure operated carburetor, and in another embodiment with a more conventional arrangement in which fuel-air mixture is compressed in the crankcase. Both types are provided with means for supplying excess air to the cylinder, but it is understood that both air and fuel may be supplied by means other than crankcase compression, as for instance by the use of blowers.

BRIEF DESCRIPTION OF THE DRAWINGS

In the accompanying drawings, showing typical illustrative embodiments of the invention:

FIG. 1 is a vertical cross-section of a first form of the invention;

FIG. 2 is a horizontal cross-section of the ignition chamber, taken along the line 2—2 of FIG. 1;

FIG. 3 is a diagrammatic sketch of the ignition chamber, in enlarged scale, showing gas flow lines during compression;

FIG. 4 is a diagrammatic vertical cross-section of the ignition and combustion chambers, showing gas flow lines during combustion;

FIG. 5 is a diagrammatic horizontal cross-section of the engine cylinder, taken along the line 5—5 of FIG. 1, showing alternate types of gas circulation in the cylinder during compression; and FIG. 6 is a vertical cross-section of the lower cylinder and crankcase of a second embodiment of the engine showing alternate air and fuel mixture supply means.

DESCRIPTION OF A PREFERRED EMBODIMENT

The engine shown in FIG. 1 is a two cycle, water cooled type, although the principles to be described may be equally well applied to air cooled types. A cylinder block 10 having a cylinder bore 11 with reciprocating piston 12 therein has a cylinder head 13 on the upper end, and both the cylinder and the head are water cooled by means of jacket 14. A combustion chamber 15 of substantially hemispherical design is formed in head 13, and exhaust ports 16 are provided on the side of the cylinder. Intake ports 17 are located substantially opposite the exhaust ports, and communicate, via passages 18 and 19, with the crankcase 20 inside the lower engine frame 21. The usual crank shaft 22, connecting rod 23, and flywheel 24 complete the basic engine structure.

A toroidal ignition chamber 25, which has substantially the form of a spheroid with its minor axis of revolution substantially coaxial with the central axis of said cylinder bore 11, is located above chamber 15 and is joined thereto by a short passage 26. A spark plug 27 is screwed into the head 13 in a position with its electrodes 28 extending out into the central portion of said ignition chamber. An intake valve 29 and valve seat 30 therefor are located in the top of chamber 25 substantially coaxial with passage 26. An intake manifold 31 leads tangentially to valve seat 30 as shown in FIG. 2, and thus communicates tangentially with ignition chamber 25 when valve 29 is open, as shown.

Intake valve 29 is operated by the usual rocker arm 32, push rod 33, tappet 34, and cam 35 on crankshaft 22, and is closed by spring 36. Intake manifold 31 is connected by an intake pipe 37 to branch passage 38 in carburetor 39. Carburetor 39 is provided with an air passage 40 which joins passages 19 and 38 at its outlet end and passage 41 at its inlet end. Passage 41 communicates directly with crankcase 20. Carburetor 39 is of the type which operates at slightly above atmospheric pressure, with the air being pushed through it, rather than being drawn through at slightly less than atmospheric pressure. An air passage 42 admits air to crankcase 20, and is closed by the usual leaf spring 43 to prevent outflow.

In operation, the piston 12, during its upward stroke, draws air into crankcase 20 via passage 42 in the usual two cycle manner. When the piston comes back again to its low position shown in FIG. 1 the air in the crankcase is compressed, and flows into cylinder 11 via passages 41, 40, 18, and 19 when piston 12 uncovers port 17. This is shown by flow line 44. Air alone passes up passage 18, but the air passing through passage 40 picks up fuel in carburetor 39 forming the usual substantially stoichiometric fuel-air mixture, and this mixture, together with the air from passage 18 enter cylinder 11 and mix to produce a lean mixture therein. Alternate methods of operation will be described later.

Cam 35 on crankshaft 22 is designed to open valve 29 when intake port 17 is opened, and to hold said valve open during the duration of time port 17 is open. Consequently, the fuel-air mixture from carburetor 39 divides and flows in part through passage 19 toward said cylinder and in part up through passage 38, pipe 37 and manifold 31, through valve 29 and into ignition chamber 25 as shown by flow line 45. The tangential spin about the central axis of said cylinder and ignition chamber, as induced by manifold 31, is shown in FIGS. 1 and 2. The mixture, after spinning about the periphery of chamber 25, spirals inwardly and flows down through passage 26 into the upper portion of chamber 15. This action thoroughly purges the ignition chamber of exhaust gas.

During the compression stroke of piston 12, valve 29 is closed, and the gases in cylinder 11 are compressed into combustion chamber 15 and in part into ignition chamber 25. These gases consist of exhaust gases not purged from the cylinder during the previous exhaust cycle, plus the air and fuel mixture displaced into the cylinder through ports 17. The compression induced flow into ignition chamber 25 is shown in FIG. 3 by flow lines 46. Any fuel mixture which entered the top of the combustion chamber 15 from the ignition chamber 25 while it was being filled is the first gas to be compressed back into the ignition chamber, and this is then followed by the lean fuel-air mixture and exhaust gases from the cylinder. The compressed gases flow radially outward, from passage 26, then turn down and inwardly, as shown, to produce a toroidal circulation about a circular axis 47. The fuel mixture which remained in the ignition chamber during the charging period is compressed toward and concentrated along said axis, while the other gases flow in around the outside and in doing so do not appreciably intermix therewith.

Near the end of the compression stroke, the long reach spark plug 27, with its electrodes 28 located substantially on the axis 47 where the uncontaminated fuel-air mixture is concentrated, ignites said mixture, and the resultant combustion produces a flow pattern as shown by flow lines 48 in FIG. 4. The flaming gases flow inwardly, then flow down passage 26 onto the top of piston 12, then spread outward radially and upward to produce a toroidal flow pattern in the combustion chamber 15. The initial combustion is fast and dependable because the stoichiometric mixture is uncontaminated with exhaust gas, and the flame then envelopes and ignites the fuel in the main combustion chamber 15 quickly and uniformly. The excess air present insures complete combustion, and combustion is fast, even in the presence of a preponderance of residual exhaust gases encountered at light load and idle operation. This combustion system insures even firing and odorless combustion even when the engine is idling as well as freedom from detonation at full load. At the end of the power stroke, the burned gases escape through the exhaust port 16 as shown by flow line 49.

In order to more completely retain and localize the fuel mixture in chamber 25 during the compression cycle, it is necessary to compress back into said chamber the portion of the mixture that flowed out into the upper part of the main combustion chamber 15 during the charging cycle. This is most effectively accomplished by circulating the gases in cylinder 11 about the central axis thereof in the same direction as the mixture circulates in the ignition chamber 25 and the upper portion of chamber 15. This is done by orienting the intake ports 17 somewhat tangentially in a horizontal plane as shown in FIG. 5 and obtaining an axial spin as shown by flow line 50. It is understood that this spin is in reality a spiral flow upward as the ports are also inclined upwardly as shown in FIG. 1.

Two cycle engines are of necessity full pressure cycle types because it is not possible to reduce the pressure in the cylinder below atmospheric pressure at part load. Control of power is obtained by varying the quantity of new fuel-air mixture introduced each cycle, and this is accomplished by means of the throttle valves 51, 52 and 53 which are linked together by means of rods 54 so they all operate together. At full load, throttle 53 is substantially closed, while throttles 51 and 52 are open. Limited excess air is admitted from the crankcase, and a substantially full fuel charge enters the cylinder and the ignition chamber simultaneously. At no load and idle operation, throttle 52 is closed, throttle 51 controls the quantity of mixture admitted to the ignition chamber, and throttle 53 is open to admit as much air as is desired. Combustion is greatly improved if some air is mixed with the residual exhaust gas in the cylinder. However, enough air is available in the crankcase to almost completely purge the cylinder of exhaust and since this may overcool the working fluid in the cylinder, best results are obtained by adding air in limited amounts. Throttle 55 is provided to control the quantity of air admitted and is connected by rod 56 to throttle 51 of the carburetor.

An alternate method of operation may also be used. By connecting the air passage 18 directly to passage 57 which opens into cylinder 11 through the separate port 58, as shown in FIG. 5, the air will flow separately into the cylinder in a stream 59 which is unmixed with the fuel mixture 50. Both the air and fuel mixture circulate around the cylinder walls in substantially parallel flows with the air on the outside next to the cylinder wall. Combustion is faster and cleaner when the normal stoichiometric fuel mixture in the cylinder is substantially all burned before the stratified excess air is mixed into the reaction.

A second embodiment of the invention is shown in FIG. 6, which shows modification of the crankcase and ports, but the cylinder head and ignition chamber (not shown) are identical to those shown in FIG. 1. This engine differs from the first embodiment in the manner in which excess air is delivered to the engine cylinder, and also it is shown with the more common fuel system, in which the fuel mixture is drawn from a carburetor into the crankcase. In the first form of the second embodiment as shown, the air is admitted to the cylinder prior to the admission of the fuel mixture, and the fuel mixture, when it is introduced into the cylinder, is not directly mixed with the air. The air remains as a stratified charge, and because it is introduced first, it displaces the exhaust gas from the cylinder. Some air may be lost out of the exhaust ports in the process, but this prevents the loss of the later entering fuel mixture.

In FIG. 6, parts identical with the engine shown in FIG. 1 are identified by the same numerals but with the suffix "a" added. The added parts include a standard carburetor 60 which communicates with crankcase 20a through passage 61 and leaf spring 62 in the usual manner. Throttle 63 controls the power of the engine. The crankcase is connected by the rather long passage 64 to the cylinder port 17a, and it is also connected to the ignition chamber (not shown in FIG. 6) by passage 45a. A throttle 65 is provided in passage 64, together with an air inlet passage 66. This passage has a throttle 67 and a check valve 68 shown as a leaf spring type which admits air to passage 64 but prevents its escape. The three throttles are all connected together by rods 69 and 70 and generally open and close together but not all close an equal amount as will be described.

When piston 12a rises on the compression stroke, port 17a and valve 29 in the ignition chamber are closed. A fuel-air mixture from carburetor 60 is drawn into the crankcase 20a in the usual manner, the amount being controlled by throttle 63. At the same time, air is drawn into long passage 64 through air inlet 66, the amount being controlled by throttle 67. Check valves 62 and 68 are adjusted to open at substantially the same pressure, and throttles 63 and 67 are set so that at all throttle positions, the long passage 64 is being filled with air while the crankcase is being filled with a fuel-air mixture. The air flow is shown by arrow 71, and throttle 67 is adjusted to limit the air to a quantity which will substantially fill said passage 64 but not also flow into crankcase 20a. The capacity of passage 64 is designed to hold the quantity of air which is to be admitted to the cylinder.

When the piston descends on the power stroke, the fuel mixture is compressed in the crankcase and some passes into the open end 72 of passage 64 to compress the air therein. The mixture acts as a piston, driving the air ahead of the mixture without appreciable intermixing. This is shown by arrow 73. Near the bottom of the piston stroke, the cylinder port 17a and the valve 29 in ignition chamber 25 are opened and the compressed fuel mixture flows simultaneously up passage 45a to said ignition chamber as shown by arrow 74, and through passage 64 into cylinder 11a through port 17a as shown by arrow 75.

The air in passage 64 will, however, enter the cylinder first in a stratified body, and act to purge the cylinder of exhaust gas ahead of the following fuel-air mixture. The air also tends to remain separated from the fuel mixture as both circulate in the cylinder. At full load, all throttles are open, and the division of the fuel mixture between the ignition chamber and the cylinder is obtained simply by adjusting the relative size (flow resistance) of passages 45a and 64. At part load and idle, throttle 65 acts to restrict passage 64 so that a larger proportion of the mixture in the crankcase goes to the ignition chamber. At idle, the adjustment is such that only the air held in passage 64 enters the cylinder, while substantially all the fuel mixture enters the ignition chamber.

It will be evident that during the subsequent compression stroke, the air entering passage 64 through passage 66 will displace the fuel mixture remaining therein back into the crankcase, and the passage is again filled with air. The throttle 65 is adjusted to close less tightly than air control throttle 67, so that the latter controls the inflow of air, while the former controls the flow into the cylinder. It is, of course, possible to place throttle 65 at point 76 to make both throttles completely independent.

A variation in the design of the second embodiment is obtained by having carburetor 60 connected to passage 66 and having air only enter the crankcase through passage 61. Then the fuel mixture will be stored in passage 64 while the excess air is held in the crankcase and the air will enter the cylinder after the fuel mixture rather than before it. It will be evident that the fuel mixture for the ignition chamber, in this arrangement, will be taken from passage 64 directly in place of from the crankcase.

The engine is shown with a rib 78 on the piston 12a to deflect the entering mixture upwardly in conventional two cycle manner, but this is not preferred. Systems such as those known as loop flow scavenging which employ flat top pistons are preferred. The improvements described herein are applicable to any known scavenging system. Also the use of a spring loaded poppet valve in the ignition chamber is also illustrative, since other valve means, such as slide, rotary, or piston and port type valves may be used.

We claim:

1. In a spark ignition engine of the two cycle type having a cylinder and piston and combustion chamber, the combination of: a first fuel-air mixture supply means for said combustion chamber; an ignition chamber in communication with said combustion chamber; a second fuel-air mixture supply means for said ignition chamber; an excess air supply means for said combustion chamber; a first variable flow control means for said first fuel-air mixture supply means; a second variable flow control means for said second fuel-air mixture supply means; a third variable flow control means for said air supply means; and means to coordinate the operation of said first, second and third flow control means, whereby said second means opens first, at least in part, and said first and said third means open subsequently in substantially parallel manner but in independent amounts.

2. A combination as in claim 1 in which said first fuel-air mixture supply means and said excess air supply means include a common port of entry into said engine cylinder, and a connecting manifold means consisting of a relatively long passage of relatively small cross-section; means for supplying said fuel-air mixture, and said excess air to said passage in sequence during the charging cycle of said cylinder, whereby said air is delivered to said cylinder first, and said fuel-air mixture is delivered secondly.

3. A combination as in claim 2 in which said engine includes the crankcase of a conventional two cycle engine in which the fuel-air mixture for the combustion chamber is stored prior to delivery to said cylinder; said manifold means connects said crankcase to said cylinder port of entry; and said excess air is stored in said manifold prior to its delivery to said cylinder in advance of the delivery of the fuel-air mixture in said crankcase to said cylinder through said manifold.

4. A combination as in claim 3 in which said manifold means includes a branch passage open to receive air; and check valve means in combination with said branch passage to permit admission of air to said passage but prevent its escape during the cylinder charging cycle when said air is displaced into said cylinder.

5. A combination as in claim 4 in which the said third variable flow control means for said air is located in said branch passage including said check valve.

6. A combination as in claim 3 in which the fuel-air mixture supply means for the ignition chamber is common with the fuel-air mixture supply means for the combustion chamber, and the mixture is stored in said crankcase; and said first variable fuel-air mixture flow control means are located in said manifold means to variably restrict the flow of fuel-air mixture into said cylinder, and divert said fuel-air mixture in said crankcase, at least in part, into said ignition chamber through conduit means independent of said manifold means.

References Cited

UNITED STATES PATENTS

| 1,043,254 | 11/1912 | Russell. |
| 3,363,611 | 1/1968 | Von Seggern et al. |

FOREIGN PATENTS

| 8,385 | 1915 | Great Britain. |
| 749,456 | 11/1944 | Germany. |

WENDELL E. BURNS, Primary Examiner

U.S. Cl. X.R.

123—73, 119, 127